Aug. 11, 1936.　　　　J. C. JAQUES　　　　2,050,952
PORTABLE SAW
Filed May 18, 1936　　　　2 Sheets-Sheet 1

John C. Jaques
INVENTOR.

BY Jack A. Ashley
ATTORNEY.

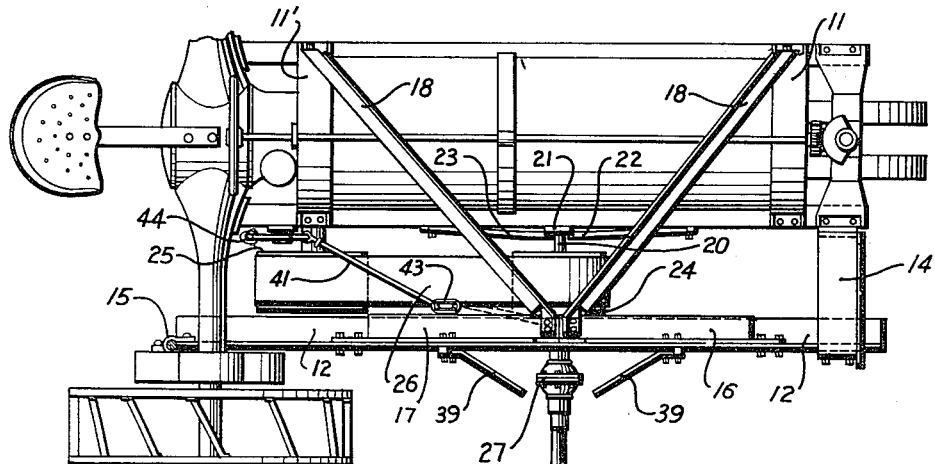
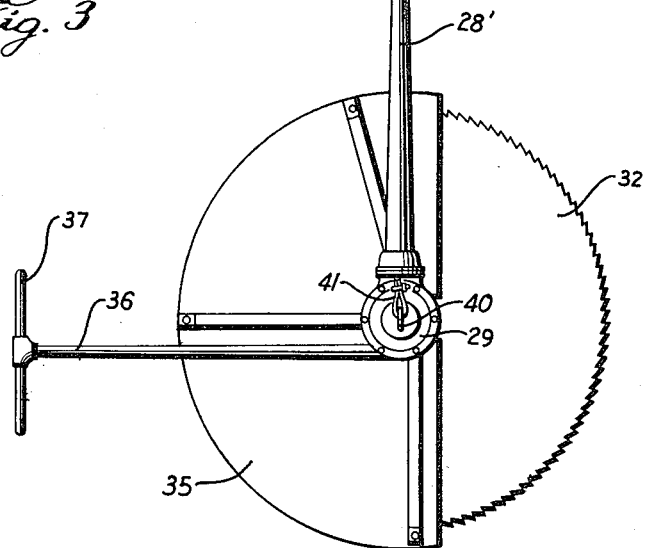
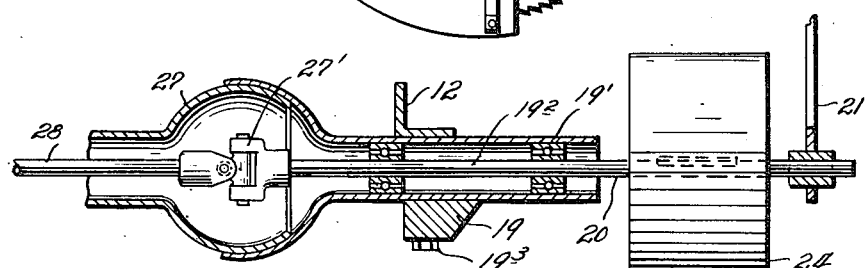
John C. Jaques.
INVENTOR.

Patented Aug. 11, 1936

2,050,952

UNITED STATES PATENT OFFICE 2,050,952

PORTABLE SAW

John C. Jaques, Austin, Tex.

Application May 18, 1936, Serial No. 80,230

6 Claims. (Cl. 143—43)

This invention relates to new and useful improvements in portable saws.

One object of the invention is to provide an improved portable saw which is adaptable to the cutting of underbrush, trees and the like, and also may be used for logging timber and clearing tracts of land.

Another object of the invention is to provide a saw so mounted as to rotate in approximately a horizontal plane, and which can be swung through an arc of sufficient amplitude to bring said saw into position to cut, whereby a great amount of flexibility of the saw is obtained.

A particular object of the invention is to provide an improved saw so constructed and mounted that it may be readily moved as desired, and the operation of cutting timber and clearing land is facilitated.

A further object of the invention is to provide a saw which is adjustable so that it may be conveniently operated at various elevations above the ground, as desired.

A construction designed to carry out the invention will be hereinafter described, together with other features of the invention.

The invention will be more readily understood from a reading of the following specification and by reference to the accompanying drawings, in which an example of the invention is shown, and wherein:

Figure 3 is a plan view of the same.

Figure 4 is a detail view, partly in section of the driving connection on the frame.

Figure 1:
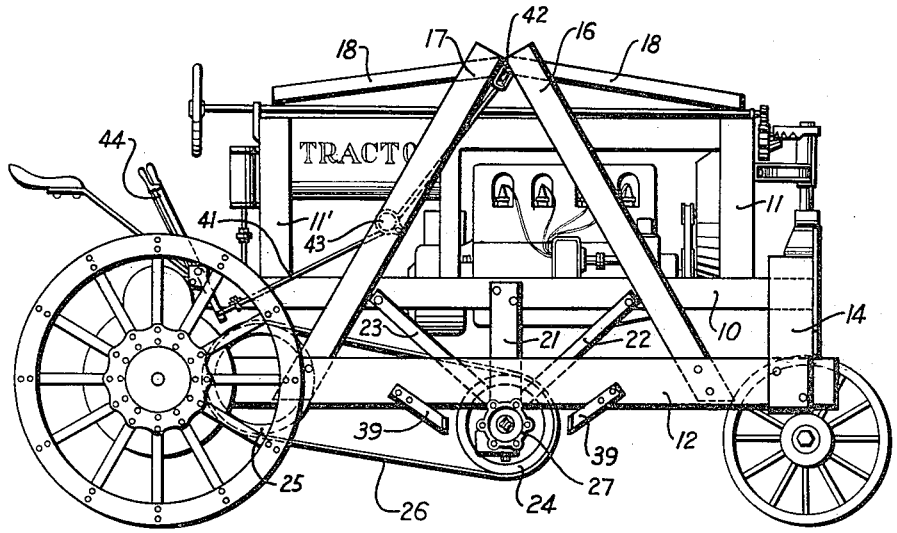
Figure 1 is a side elevation of a device constructed in accordance with the invention and mounted on a suitable support, the saw and its supporting boom not being shown.
Figure 2:
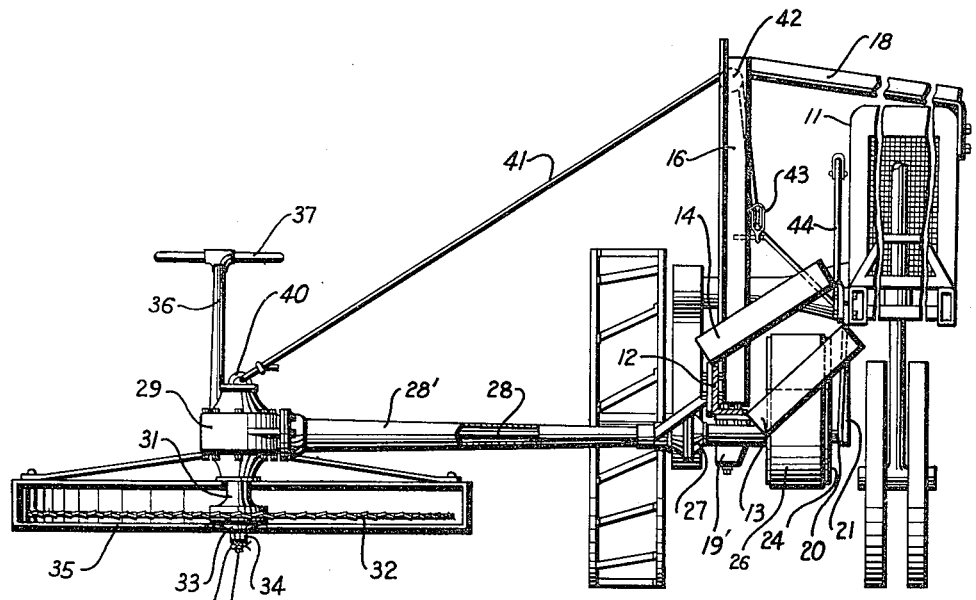
Figure 2 is an end elevation of the device and its support.

In the drawings the numeral 10 designates the usual frame of any suitable tractor on which is mounted the upright supports 11 and 11'. A suitable angle bar 12 forms an auxiliary support or base on which the invention is mounted. The front end of the support is suitably connected by angle bars 13 and 14 to the frame 10 of the tractor, and the rear end is fastened to the regular yoke connection 15 of the tractor.

Two angle bar members 16 and 17 are mounted intermediate the ends of the supporting base 12, said members being so mounted that the upper ends thereof converge and a triangular frame is formed. The upper end of said frame is connected to the upright supports 11 and 11' by the angle bars 18, so as to securely brace and support said frame.

A housing tube $19^1$ for the outer end $19^2$ of a drive shaft 20 which carries a driven pulley 24, is supported upon the lower face of the frame or supporting base 12, through the medium of a block 19 secured by bolts $19^3$ or the like. The pulley shaft 20 has its inner end journaled in the lower end of the depending member 21, supported from the tractor chassis, while the opposite or outer end $19^2$ is suitably journaled within the tubular housing $19^1$, as shown in Fig. 4, from whence it extends into the universal joint housing 27, and through a universal joint $27^1$ is connected to the inner end of the drive shaft 28, within the housing torque tube $28^1$, having at its outer end, a suitable differential 29.

Brace members 22 and 23 are attached to the lower end of the depending bar 21 or to the shaft 20 to prevent side-sway or movement of said shaft. The usual power take-off of the tractor is provided with a driving pulley 25 and the two pulleys are connected by a suitable endless belt 26. It is pointed out that various sizes of pulleys may be used in order to regulate the power and the speed of the shaft 20 in accordance with the requirements of each individual installation. The differential contained in the housing 29 may be any type desired, or any suitable automobile differential.

A short stub shaft 30 depends from the differential housing and is externally screw threaded on its lower end, so that a flanged hub 31 may be threaded onto the shaft and rotate therewith. If desired, the hub may be keyed onto the shaft so as to form an additional lock or fastening therebetween. A circular saw 32 is mounted on the shaft 30 below said hub and abuts the same. The saw is preferably not attached to the shaft 30, in order that same may slip if it becomes jammed and thereby preventing breakage or damage to the saw, although said saw may be fastened to the shaft if desired. A flanged hub 33, somewhat similar to the hub 31, is threaded onto the stub shaft 30 below the saw. The hub is tightened on the shaft, so as to clamp the saw between the hubs 31 and 33. If desired, the hub 33 may also be keyed to the shaft 30. A jam or lock nut 34 is preferably threaded onto said shaft, so as to fasten the hub 33 thereto. If desired, a cotter key or pin 38 may be provided at the lower end of the shaft below said nut as an additional locking means therefor.

A protecting cover or guard 35 for the saw is provided and as will be seen in Figure 3, the guard exposes only a sufficient portion of the saw which is necessary for cutting purposes. A suitable brace rod 36 having a handle 37 is preferably attached to the differential housing, in order to control the swinging movement of the saw and to efficiently operate said saw. The handle 37 may be grasped and the swiftly rotating saw 32 may be steadied and moved into cutting engagement with the object to be sawed. Suitable stops 39 are provided on the supporting bar 12 and extend therefrom, so as to prevent the drive shaft 28 being swung in too great an arc. If the drive shaft and saw were swung in too great an arc, there is a possibility of fracturing the universal joint 27.

The upper end of the differential housing 29 is provided with a suitable ring 40, to which a cable 41 is connected. This cable leads up to the upper end of the triangular frame formed by the members 12, 16 and 17, over suitable pulleys 42 and 43, and then is connected to a control lever 44, so that the raising and lowering of the saw may be controlled from the driver's seat of the tractor.

In operation, the auxiliary supporting bar 12 is suitably fastened to any type of tractor or a similar device as desired. As all tractors are ordinarily provided with power take-offs, the pulley 25 is mounted on the usual power take-off shaft (not shown) and is connected to the pulley 24 by the endless belt 26. Thus, it will be seen that should the saw become jammed, the belt on the two pulleys will allow slippage, whereby injury to the saw will be prevented. Also, various sizes of pulleys may be used to obtain various speed and power ratios.

The control lever 44 is swung to raise or lower the saw 32 to the desired elevation. The pulley 25 is started revolving and drives the pulley 24 on the shaft 20, which is journaled in the tubular housing 19'. The drive shaft 28 in the housing 28' connected at one end through the universal joint 27' to the outer end of the short driven shaft 20, as shown in Fig. 4, and at the other end to the differential 29, is rotated. The stub shaft 30, saw 32, and hubs 31 and 33, all rotate as the stub shaft is driven by said differential.

In view of the fact that the saw is suspended from the cable 41 and is connected through the universal joint 27, the saw may be swung through an arc of sufficient amplitude to cut whatever is desired. The handle 37 on the brace bar 36 is grasped, so as to steady the saw 32 and swing the same. It is pointed out that as the tractor could be driven where desired, a path or swath may be cut by the saw, whereby it will be seen that the invention could be used very satisfactorily and conveniently for cutting underbrush, timber, and the like, so as to facilitate the clearing of land. The invention may be used very readily for logging and for any other uses desired.

What I claim and desire to secure by Letters Patent is:

1. A portable sawing machine comprising, in combination with a tractor having a power take-off, a frame supported upon the side of the tractor and extending longitudinally thereof, a driving pulley on said power take-off, a driven pulley carried by said longitudinal frame, a drive belt, a bearing for the shaft of said driven pulley comprising a tubular member fixed on said longitudinal frame, a torque tube having a universal connection with said first tubular member, a driven shaft within said torque tube and having a universal joint connection with the driven pulley shaft, a rotary saw supported at the outer end of said torque tube and gearing between said saw and said driven shaft.

2. A sawing machine attachment for a tractor having a power take-off, comprising a frame having means for attaching the same to the chassis of said tractor, said power take-off being adapted to carry a driving pulley, a pulley which is adapted to be driven from said driving pulley, mounted upon said side frame, said driven pulley having a power shaft, a drive belt, a tubular housing for said power shaft of said pulley fixedly secured upon said side frame, a torque tube having a universal joint connection with said tubular housing, a driven shaft within said torque tube having at its inner end a universal joint connection with the outer end of said pulley power shaft, a rotary saw having a shaft and a driving gearing between said saw shaft and the outer end of said driven shaft which is arranged within the torque tube, whereby said saw may be moved in vertical, horizontal or intermediate planes.

3. A sawing machine attachment for a tractor having a power take-off, comprising a frame having means for attaching the same to the side of the tractor chassis, said power take-off carrying a driving pulley, a driven pulley mounted upon said side frame, said driven pulley having a shaft fixed thereto, a drive belt, a tubular housing mounted upon said side frame and within which said pulley shaft has its bearing, a torque tube extending laterally from said side frame, a universal joint connection between said tubular housing and said torque tube, a shaft within said torque and having a universal joint connection with said driven pulley shaft, a vertical frame carried by said side frame having a pulley at its upper end, a lever which is adapted to be supported upon the tractor, a lifting cable trained over said pulley and having its ends connected respectively with said lever and the outer end of said torque tube, a rotary saw, and a geared connection between said saw and said shaft within the torque tube.

4. A sawing machine attachment for a tractor having a power take-off, comprising an elongated frame having means at its opposite ends for attachment to the tractor chassis in spaced relation thereto, said power take-off being adapted to carry a driving pulley, a driven pulley, having a shaft, a driving belt trained over said driving and driven pulleys, means for mounting said driven pulley upon said sub-frame comprising a tubular housing carried thereby, one end of said pulley shaft being journaled within said housing, a torque tube extending laterally from said side frame and having a universal joint connection with the outer end of said tubular housing, a driven shaft within said torque tube having its inner end provided with a universal joint connection with said driven pulley shaft, a rotary saw mounted at the outer end of said torque tube, gearing connecting said saw and driven shaft, means for raising and lowering said torque tube and driven shaft with the saw as a unit, and a handle carried by said torque tube adjacent its outer end, whereby the saw may be moved in vertical, horizontal or lateral planes from the pivotal point of the universal connections aforesaid.

5. An article of manufacture comprising a frame, means thereon whereby it may be detachably connected with the body of a tractor having a power take-off, a bearing housing supported by said frame, a torque tube having a universal joint connection with the outer end of said bearing housing, a rotary shaft journaled within said bearing housing and having a pulley secured to the inner end thereof, a drive belt, a driven shaft within said torque tube, a universal joint connection between the inner end of said driven shaft and the outer end of said rotary shaft arranged within the universal joint connection of said torque tube, a saw shaft, a saw on said shaft, and driving means between said saw shaft and the driven shaft within the torque tube.

6. A portable sawing attachment including, in combination with a portable machine having a power unit, a driven connection arranged to be driven by the power unit, a support for the driven connection attached to the portable machine in close proximity to the ground, means for driving the driven connection arranged to be connected with the power unit of said portable machine, a rigid torque tube, a universal swinging connection between the inner end of said torque tube and the supporting means whereby said tube is mounted for universal movement, a rotatable shaft extending through said tube having a driven and universal swinging connection with the driven connection, an enclosure mounted on the outer end of the tube, a saw shaft in said enclosure having its outer end extending therefrom, driving gearing in the enclosure connecting the said shafts, said enclosure completely enclosing the gearing and excluding sawdust, a circular saw secured on the outer end of the saw shaft, flexible means for suspending the outer end of said tube, whereby it may be swung universally, the inner end of the torque tube being in such close proximity to the ground so as to permit the saw to cut horizontally close to the ground.

JOHN C. JAQUES.